(12) United States Patent
Tang (10) Patent No.: US 10,869,314 B2
(45) Date of Patent: Dec. 15, 2020

(54) METHOD AND TERMINAL DEVICE FOR ALLOCATING LOGICAL CHANNEL RESOURCES

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/369,496

(22) Filed: Mar. 29, 2019

(65) Prior Publication Data

US 2019/0230666 A1 Jul. 25, 2019

Related U.S. Application Data

(63) Continuation of application No. PCT/CN2017/083257, filed on May 5, 2017.

(51) Int. Cl.
*H04W 72/04* (2009.01)
*H04W 72/10* (2009.01)
(Continued)

(52) U.S. Cl.
CPC ..... *H04W 72/0453* (2013.01); *H04W 28/065* (2013.01); *H04W 72/10* (2013.01); *H04W 72/1242* (2013.01)

(58) Field of Classification Search
None
See application file for complete search history.

(56) References Cited

U.S. PATENT DOCUMENTS

2012/0269154 A1\* 10/2012 Wang ................ H04W 72/1284
370/329
2014/0029564 A1\* 1/2014 Harada ................. H04W 72/10
370/329
(Continued)

FOREIGN PATENT DOCUMENTS

CN 101606336 A 12/2009
CN 101933385 A 12/2010
(Continued)

OTHER PUBLICATIONS

Intel Corpora:"User plane architecture for NR", R2-165006 (3GPP), Mobile Competence Centre; 650, Routh Des Lucioles; F-06921 Sophia-Antipolis Cedex; France, vol. RAN WG2, No. Gothenburg, Sweden; Aug. 22, 2016-Aug. 26, 2016; Aug. 21, 2016.
(Continued)

*Primary Examiner* — Ayaz R Sheikh
*Assistant Examiner* — Faiyazkhan Ghafoerkhan (57) ABSTRACT

Embodiments of the present application relate to a method and a terminal device for allocating logical channel resources. The method includes: determining priority of at least one logical channel and total resources allocated to the at least one logical channel, the at least one logical channel includes a first logical channel not having function of segmenting data unit; allocating a first resource in the total resources to the first logical channel according to a priority of the first logical channel and data units carried on the first logical channel, the first resource is used to transmit n data units carried on the first logical channel, a size of the first resource is larger than or equal to a size of the n data units and smaller than or equal to a product of a PBR and a TTI of the first logical channel, and n is a positive integer.

14 Claims, 5 Drawing Sheets

(51) Int. Cl.
*H04W 28/06* (2009.01)
*H04W 72/12* (2009.01)

(56) References Cited

U.S. PATENT DOCUMENTS

| | | | | |
|---|---|---|---|---|
| 2014/0161108 | A1* | 6/2014 | Lohr | H04L 5/0039 370/336 |
| 2015/0189675 | A1* | 7/2015 | Feuersaenger | H04W 52/327 370/329 |
| 2017/0041933 | A1* | 2/2017 | Sammour | H04L 47/39 |
| 2017/0064534 | A1* | 3/2017 | Loehr | H04W 72/0413 |
| 2017/0215160 | A1* | 7/2017 | Lohr | H04W 76/10 |
| 2017/0230928 | A1* | 8/2017 | Basu Mallick | H04W 56/0045 |
| 2018/0014313 | A1* | 1/2018 | Yi | H04W 72/10 |
| 2018/0176937 | A1* | 6/2018 | Chen | H04W 74/085 |
| 2018/0255499 | A1* | 9/2018 | Loehr | H04B 7/2606 |
| 2018/0317123 | A1* | 11/2018 | Chen | H04W 72/0413 |
| 2018/0324641 | A1* | 11/2018 | Tsai | H04L 69/321 |
| 2019/0028877 | A1* | 1/2019 | Loehr | H04W 72/0413 |
| 2019/0028980 | A1* | 1/2019 | Feuersaenger | H04W 52/346 |
| 2019/0098592 | A1* | 3/2019 | Lohr | H04W 76/14 |
| 2019/0239242 | A1* | 8/2019 | Yi | H04W 72/14 |
| 2019/0246418 | A1* | 8/2019 | Loehr | H04W 76/14 |
| 2019/0253983 | A1* | 8/2019 | Feuersaenger | H04W 52/327 |
| 2019/0297644 | A1* | 9/2019 | Babaei | H04L 5/0094 |
| 2019/0342895 | A1* | 11/2019 | Loehr | H04W 28/0278 |

FOREIGN PATENT DOCUMENTS

| | | |
|---|---|---|
| CN | 102036390 A | 4/2011 |
| CN | 102271408 A | 12/2011 |
| CN | 102291833 A | 12/2011 |
| CN | 102377803 A | 3/2012 |
| CN | 104754750 A | 7/2015 |
| CN | 105792361 A | 7/2016 |
| WO | 2015/021609 A1 | 2/2015 |

OTHER PUBLICATIONS

ZTE Corporation et al:"Consideration on the Segmentation and Concatenation for NR UP", R2-165125 Consideration on the Segmentation and Concatenation for NR UP; 3GPP; Mobile Competence Centre; 650, Route Des Lucioles; F06921 Sophia-Anti, vol. RAN WG2, No. Gothenburg, Sweden; Aug. 22, 2016-Aug. 26, 2016; Aug. 21, 2016.
Huawei et al: "Analysis of L2 Segmentation and Concatenation in NR", R2-166196 (3GPP); Mobile Competence Centre; 650, Route Des Lucioles; F-06921 Sophia-Antipolis Cedex; France, vol. RAN WG2, No. Kaohsiung; Oct. 10, 2016-Oct. 14, 2016; Oct. 9, 2016.
Fujitsu: "Considerations on the segmentation function in NR", R2-168231 Considerations on Segmentation in NR (3GPP), Mobile Competence Centre; 650; Route Des Lucioles; F-06921 Sophia-Antipolis Cedex; France, vol. RAN WG2, No. Reno, USA; Nov. 14, 2016-Nov. 18, 2016; Nov. 13, 2016.
Extended European European Report dated Sep. 16, 2019; Appln. No. 17908184.9.
"Correction on the Logical channel prioritization in DC", ZTE, 3GPP TSG-RAN WG2 Meeting #89, R2-150562.
Ericsson; "New E-UTRA MAC test case 7.1.4.3a for logical channel prioritization handling for Category 0 UE", 3GPP TSG-RAN WG5 Meeting #68 Beijing, China, Aug. 24-28, 2015; R5-153955, 6 pages.
LG Electronics Inc; "Clarification on DPR MAC CE", 3GPP TSG-RAN WG2 #97, Athens, Greece, Feb. 13-Feb. 17, 2017; Agenda Item: 7.14.2; R2-1702115, 3 pages.
ZTE; "Correction on the Logical channel prioritization in DC", 3GPP TSG-RAN WG2 meeting #89; Athens, Greece, Feb. 9-13, 2015; R2-150562, 3 pages.
International Search Report dated Jan. 26, 2018; PCT/CN2017/083257.
The first Office Action of corresponding European application No. 2 17908184.9, dated Jan. 24, 2020.
The First Office Action of corresponding Chinese application No. 201780053514.5, dated Dec. 10, 2019.

* cited by examiner

FIG. 1

Determining a priority of at least one logical channel and total resources allocated to the at least one logical channel, the at least one logical channel includes a first logical channel that does not have a function of segmenting a data unit ~S110

Allocating a first resource in the total resources to the first logical channel according to a priority of the first logical channel and data units carried on the first logical channel, the first resource is used to transmit n data units carried on the first logical channel, a size of the first resource is larger than or equal to a size of the n data units, and the size of the first resource is smaller than or equal to a product of a PBR and a TTI of the first logical channel, and n is a positive integer ~S120

Transmitting the n data units by the first resource ~S130

METHOD AND TERMINAL DEVICE FOR ALLOCATING LOGICAL CHANNEL RESOURCES

CROSS-REFERENCE TO RELATED APPLICATIONS

This application is a continuation of International Application No. PCT/CN2017/083257 filed on May 5, 2017, the content of which is incorporated herein by reference in its entirety.

TECHNICAL FIELD

The present application relates to the field of communications, and in particular, to a method and a terminal device for allocating logical channel resources.

BACKGROUND

The LTE Radio Link Control (RLC) protocol (TS36.322) specifies that functions supporting concatenation and segmentation of RLC Service Data Units (SDU) are required for RLC Unacknowledged Mode (UM) and Acknowledged Mode (AM). The concatenation is supported for the purpose that when a transmission resource provided by Medium Access Control (MAC) is larger than a size of one RLC SDU, RLC may concatenate multiple RLC SDUs together to form an RLC Protocol Data Unit (PDU) so that the resource can be fully utilized. The segmentation of the RLC SDU is supported for the purpose that assuming that a resource provided by the MAC layer is smaller than a size of one RLC SDU or a resource provided by the MAC layer is larger than a size of one RLC SDU but cannot transmit an integer number of RLC SDUs, RLC needs to segment the RLC SDU so that the resource provided by the MAC layer is fully utilized.

For the operation of concatenating and segmenting RLC SDU, the RLC protocol specifies that the operation of assembling RLC PDU can be initiated only after the RLC protocol layer obtains the transmission opportunity notified by the MAC layer, i.e., after the granted resources have been allocated, where the operation of assembling the RLC SDU into an RLC PDU may include concatenation and/or segmentation.

For these two functions, they are enabled for an RLC entity by default under any conditions, i.e. non-configurable. However, for some traffic that are sensitive to the requirement of the time delay, such real-time concatenation and segmentation operations may cause time delay, thereby resulting in unable to meet the Quality of Service (QoS) requirements for the time delay traffics in these cases.

Therefore, in the discussion of standardizing the NR, the concatenation function has been removed from the RLC layer, for which a main consideration is to enable preprocessing the RLC PDU packet of the RLC layer, that is, the assembling of RLC PDUs can be initiated without the RLC layer obtaining a resource grant of the MAC layer. In this case, once the RLC layer obtains a resource grant of the MAC layer, the already assembled RLC PDU can be sent to the MAC layer to be further assembled into a PDU of the MAC layer. It is worth noting that NR RLC still maintain the segmentation operation, also for the purpose that the granted resources of the MAC layer are more fully utilized, that is, if there are remaining resources, an RLC SDU can also be segmented to entirely filling the granted resources. Retaining the segmentation operation of RLC can also introduce the time delay. For example, an already assembled RLC PDU needs to be re-segmented because it cannot entirely fill granted resources of the MAC layer. Therefore, it can be considered to configure the segmentation function of some logical channels to be disabled. However, disabling the segmentation function may affects the ordering process of the existing logical channel prioritization (LCP), so it is required to improve the existing method for allocating logical channel resource.

SUMMARY

The present application provides a method and a terminal device for allocating logical channel resources, which can effectively utilize granted resources and rapidly process data packets of a logical channel that a function of segmenting data units is disabled.

In a first aspect, a method for allocating logical channel resources is provided, including: determining a priority of at least one logical channel and total resources allocated to the at least one logical channel, the at least one logical channel includes a first logical channel that does not have a function of segmenting a data unit; allocating a first resource in the total resources to the first logical channel according to a priority of the first logical channel and data units carried on the first logical channel, the first resource is used to transmit n data units carried on the first logical channel, a size of the first resource is larger than or equal to a size of the n data units, and the size of the first resource is smaller than or equal to a product of a priority bit rate (PBR) and a transmission time interval (TTI) of the first logical channel, and n is a positive integer; transmitting the n data units by the first resource.

Therefore, method for allocating logical channel resources in an embodiment of the present application allocates resources to a logical channel that does not have the function of segmenting data units, and the allocated resources are satisfied to be larger than or equal to sizes of an integer number of data units and smaller than a size of PBR*TTI of the logical channel, thus realizing a rapid allocation of resources to a logical channel that a function of segmenting is disabled, and also making more efficient use of granted resources.

With reference to the first aspect, in an implementation of the first aspect, a size of n+1 data units carried on the first logical channel is larger than the size of the first resource.

It should be understood that for a logical channel that the function of segmenting data units is disabled, the allocated resources satisfy that a maximum integer number of data units can be transmitted, which can maximum utilization of the resources for transmitting data unit.

With reference to the first aspect and the above implementation thereof, in another implementation of the first aspect, the at least one logical channel includes a second logical channel that has the function of segmenting the data unit, and the method further includes: allocating a second resource for transmitting m data units carried on the second logical channel in the total resources to the second logical channel according to a priority of the second logical channel and data units carried on the second logical channel, a size of the m data units is equal to a size of the second resource, and m is a positive number.

It should be understood that m being a positive number includes that m may be a positive integer, or m may be a decimal, wherein when the m is a decimal, it indicates a ratio of segmentation for a logical channel. For example, m=2.5 indicates that the second resource transmits two complete data units and one half of a third data unit, that is, the third data unit is segmented and then is transmitted.

With reference to the first aspect and the above implementations thereof, in another implementation of the first aspect, the size of the n data units is smaller than the size of the first resource, and the transmitting the n data units by the first resource includes: transmitting, by the first resource, the n data units carried on the first logical channel and first padding bits, and a size of the first padding bits is equal to a difference between the size of the n data units and the size of the first resource.

It should be understood that when the first resource allocated to the first logical channel is larger than the size of the n data units, padding bits may be used since the logical channel cannot segment the data units.

With reference to the first aspect and the above implementations thereof, in another implementation of the first aspect, the priority of the first logical channel is larger than or equal to the priority of the second logical channel, the allocating a first resource in the total resources to the first logical channel according to a priority of the first logical channel and data units carried on the first logical channel includes: allocating, at a first moment, the first resource having a size equal to the size of the n data units to the first logical channel according to the data units carried on the first logical channel, and the size of the n+1 data units carried on the first logical channel is larger than the product of the PBR and the TTI of the first logical channel; and the allocating a second resource in the total resources to the second logical channel according to a priority of the second logical channel and data units carried on the second logical channel includes: allocating, at a second moment, a second resource to the second logical channel according to the size of the first resource and the data units carried on the second logical channel, the second resource is all or part resources of remaining resources except the first resource in the total resources, and the second moment is after the first moment.

In a plurality of logical channels, both the first logical channel that does not have a function of segmenting a data unit and the second logical channel that has a function of segmenting a data unit are included, and when the priority of the first logical channel is larger than or equal to the priority of the second logical channel, the remaining resources are always allocated to the first logical channel in preference to the second logical channel, to which the remaining resources are allocated. By analogy, if the at least one logical channel includes multiple first logical channels and multiple second logical channels, and the priorities of the first logical channels are larger than or equal to the priorities of the second logical channels, similar to the above allocation scheme, it is always to preferentially allocate for the first logical channels that does not have the function of segmenting data units and then to allocate for the second logical channels that has the function of segmenting data units.

With reference to the first aspect and the above implementations thereof, in another implementation of the first aspect, if the priority of the first logical channel is smaller than the priority of the second logical channel, allocating, at a third moment, the second resource to the second logical channel, the size of the second resource is equal to a product of a PBR and a TTI of the second logical channel, and allocating, at a fourth moment, the first resource to the first logical channel, the third moment is before the fourth moment.

With reference to the first aspect and the above implementations thereof, in another implementation of the first aspect, the allocating a first resource in the total resources to the first logical channel according to a priority of the first logical channel and data units carried on the first logical channel includes: allocating, at the fourth moment, the first resource having a size equal to the size of the n data units to the first logical channel according to the data units carried on the first logical channel, and the size of n+1 data units carried on the first logical channel is larger than the product of the PBR and the TTI of the first logical channel, and the first resource is all or part resources of remaining resources except the second resource in the total resources. The method further includes: allocating, at a fifth moment, a third resource to the second logical channel, the fifth moment is after the fourth moment, and the third resource is all or part resources of remaining resources except the first resource and the second resource in the total resources.

With reference to the first aspect and the above implementations thereof, in another implementation of the first aspect, the method further includes: allocating, at a sixth moment, a fourth resource to the first logical channel, the sixth moment is after the fifth moment, and the fourth resource is the remaining resources except the first resource, the second resource, and the third resource in the total resources.

With reference to the first aspect and the above implementations thereof, in another implementation of the first aspect, the at least one logical channel includes a third logical channel that does not have the function of segmenting the data unit, the priority of the first logical channel is equal to a priority of the third logical channel, and the method further includes: determining a difference between the size of the n data units and the size of the first resource to be a size of first padding bits, if a fifth resource having a size equal to a size of l data units carried on the third logical channel is firstly allocated to the third logical channel and then the first resource having a size larger than the size of the n data units is allocated to the first logical channel, and the size of the fifth resource is smaller than or equal to a product of a PBR and a TTI of the third logical channel; and determining a difference between the size of the l data units and the size of the fifth resource to be a size of second padding bits, if the first resource having a size equal to the size of the n data units is firstly allocated to the first logical channel and then the fifth resource having a size larger than the size of the l data units is allocated to the third logical channel.

When the size of the first padding bits is smaller than the size of the second padding bits, before the allocating a first resource in the total resources to the first logical channel according to a priority of the first logical channel and data units carried on the first logical channel, the method further includes: allocating the fifth resource having a size equal to the size of the l data units to the third logical channel, and the allocating a first resource in the total resources to the first logical channel according to a priority of the first logical channel and data units carried on the first logical channel includes: allocating the first resource having a size larger than the size of the n data units to the first logical channel.

When the size of the first padding bits is larger than the size of the second padding bits, the allocating a first resource in the total resources to the first logical channel according to a priority of the first logical channel and data units carried on the first logical channel includes: allocating the first resource having a size equal to the size of the n data units to the first logical channel, and after the allocating a first resource in the total resources to the first logical channel according to a priority of the first logical channel and data units carried on the first logical channel, the method further includes: allocating the fifth resource having a size larger than the size of the 1 data units to the third logical channel.

It should be understood that when all of the plurality of logical channels do not have a function of segmenting a data unit, a terminal device may refer to an existing ordering rule of logical channel prioritization (LCP) and allocate resources to each logical channel according to the priorities of the plurality of logical channels, and when there are two or more logical channels having a same priority among the plurality of logical channels, resource allocation may be performed according to a principle that allows padding bits to be minimum, that is, sizes of padding bits corresponding to resource allocation performed according to different sequences are calculated respectively, a minimum value of the padding bits is determined, and resource allocation is performed according to the corresponding resource allocation method.

In a second aspect, a terminal device is provided for performing the method of the first aspect or of any of the possible implementations of the first aspect as described above. Specifically, the terminal device includes units for performing the method of the first aspect or of any of the possible implementations of the first aspect as described above.

In a third aspect, a terminal device is provided, including: a memory and a processor, where the memory is configured to store an instruction, the processor is configured to execute instructions stored by the memory, and when the processor executes the instructions stored by the memory, the execution causes the processor to perform the method of the first aspect or of any of the possible implementations of the first aspect.

In a fourth aspect, a computer readable medium is provided for storing a computer program including instructions for performing the method of the first aspect or of any of the possible implementations of the first aspect.

DETAILED DESCRIPTION

The technical solutions in the embodiments of the present application will be described below with reference to the accompanying drawings.

In the LTE system, when a transmission resource provided by the MAC is larger than a size of one RLC SDU, RLC may concatenate multiple RLC SDUs together to form an RLC PDU, so that the resource can be fully utilized; when a resource provided by the MAC layer is smaller than a size of one RLC SDU or a resource provided by the MAC layer is larger than a size of one RLC SDU but cannot transmit an integer number of RLC SDUs, RLC needs to segment the RLC SDU so that the resource provided by the MAC layer is enabled to be fully utilized.

In addition, according to a logical channel prioritization (LCP), Radio Resource Control (RRC) configures each logical channel (LC) with three parameters: priority, priority bit rate (PBR) and bucket size duration (BSD), in the process of allocating resources to different logical channels. The MAC layer determines the sequence in which resources are obtained by each logical channel according to these three parameters.

Specifically, the priority determines the sequence in which the data in the logical channel is scheduled, and the greater the priority is, the lower the priority is. The PBR determines the size of resource allocated to each scheduled logical channel; the PBR and the BSD determine an upper limit of the resources that can be scheduled by each logical channel. In addition to these three parameters configured by RRC, a MAC entity maintains a variable Bj for each logical channel, and the initial value of Bj is set to 0, which increases with the increase of the Transmission Time Interval (TTI) and increases by PBR*TTI each time with an upper limit of PRB*BSD.

The LTE MAC protocol specifies a logical channel priority process. When a user equipment (UE) obtains an uplink resource grant, the UE allocates the granted resources to different logical channels according to the specified logical channel priority process which mainly consists of the following steps:

Step 1: sequencing all logical channels with Bj>0, according to the priority, so that resources of PBR*TTI are allocated to each logical channel in accordance with a sequence of priority from high to low. If the PBR of a certain logical channel is set to infinity by RRC, sufficient resources are allocated to the logical channel by the MAC before other services with lower priorities are served, so that the data of the logical channel is completely scheduled.

Step 2: updating the value of Bj by a MAC entity, and subtracting a total size of the served Radio Link Control (RLC) protocol data unit (PDU) of the corresponding logical channel from Bj;

Step 3: sequencing all the logical channels regardless of the size of Bj according to the priority and scheduling them in sequence, after Step 1 is performed and if there still remain granted resources. For each logical channel, only after data of the logical channel is completely scheduled or all remaining granted resources are used up, the next logical channel is continued to be served.

It is worth noting that after the priority is determined, when resources are allocated to each logical channel, it is also necessary to follow some criteria specified by the protocol: if a SDU can entirely fill the allocated resources, RLC shall not segment the SDU; if a SDU needs to be segmented, the segmentation method shall satisfy that the segmented part is enabled to maximize the utilization of the allocated resources.

Figure 1:
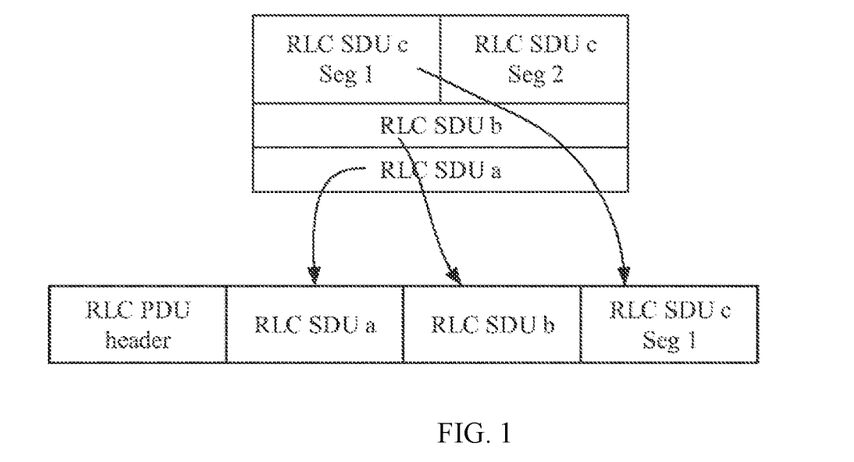
FIG. 1 is a schematic diagram of segmentation and concatenation operations in LTE according to an embodiment of the present application.

Specifically, FIG. 1 shows a schematic diagram of segmentation and concatenation operations in LTE according to an embodiment of the present application. As shown in FIG. 1, for three RLC SDUs, i.e., RLC SDU a, RLC SDU b, and RLC SDU c, a size of resources provided by the MAC layer can transmit the entire RLC SDU a and the entire RLC SDU b, but a size of remaining resources is smaller than a size of the entire RLC SDU c. Therefore the RLC SDU c can be segmented into two segments, i.e., RLC SDU c Seg 1 and RLC SDU c Seg 2, where a size of the RLC SDU c Seg 1 is equal to a size of the remaining resources, that is, the RLC SDU a, the RLC SDU b, and the RLC SDU c Seg 1 are assembled into an RLC PDU according to the size of the resources provided by the MAC layer, so that the resources provided by the MAC layer are fully utilized. Optionally, the assembled RLC PDU may further include an RLC PDU header portion.

However, in the NR system, the concatenation function has been removed from the RLC layer, and the RLC layer can initiate an assembling of an RLC PDU without obtaining a resource grant of the MAC layer. In this case, once the RLC layer obtains a resource grant of the MAC layer, the already assembled RLC PDU can be sent to the MAC layer to be further assembled into a PDU of the MAC layer.

The segmentation operation is still retained in the NR RLC, that is, if there are remaining resources, an RLC SDU can also be segmented to entirely fill the granted resources. Retaining the segmentation operation of RLC can also introduce time delay. For example, an already assembled RLC PDU needs to be re-segmented due to its failure to entirely fill the granted resources of the MAC layer. Therefore, it can be considered to configure the segmentation function of some logical channels to be disabled. Disabling a segmentation function may affect the existing LCP, for example, the additional padding may be introduced. Therefore, an embodiment of the present disclosure provides a method for allocating logical channel resources, which can improve the existing logical channel resource allocation rules.

Figure 2:
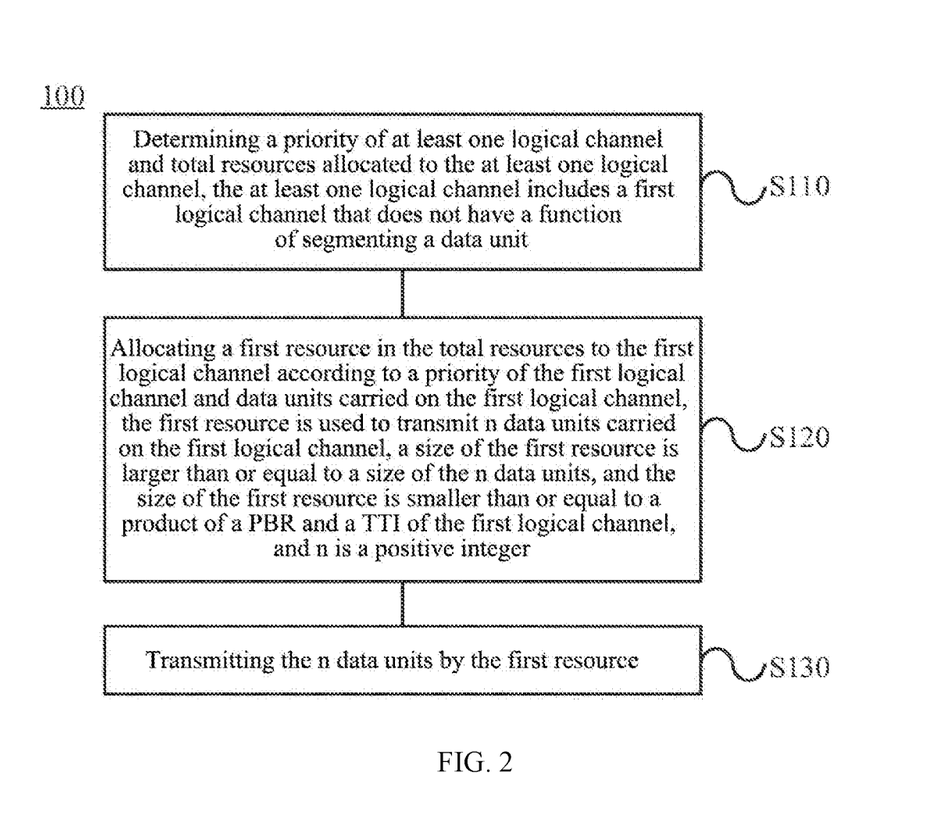
FIG. 2 is a schematic flowchart of a method 100 for allocating logical channel resources according to an embodiment of the present application.

FIG. 2 shows a schematic flowchart of a method 100 for allocating logical channel resources according to an embodiment of the present application. The method 100 can be performed by a terminal device. Specifically, the method 100 includes:

S110: determining a priority of at least one logical channel and total resources allocated to the at least one logical channel, the at least one logical channel includes a first logical channel that does not have a function of segmenting a data unit;

S120: allocating a first resource in the total resources to the first logical channel according to a priority of the first logical channel and data units carried on the first logical channel, the first resource is used to transmit n data units carried on the first logical channel, a size of the first resource is larger than or equal to a size of the n data units, and the size of the first resource is smaller than or equal to a product of a PBR and a III of the first logical channel, and n is a positive integer;

S130: transmitting the n data units by the first resource.

Specifically, the terminal device may determine at least one logical channel, and the at least one logical channel may include a first logical channel that does not have a function of segmenting a data unit, and may further include a second logical channel that has a function of segmenting a data unit. The terminal device may allocate a granted resource to the at least one logical channel according to a priority of the at least one logical channel, where a first resource allocated to the first logical channel for transmitting n data units carried on the first logical channel satisfies: a size of the first resource is larger than or equal to a size of the n data units, and the size of the first resource is smaller than or equal to the product of the PBR and the TTI of the first logical channel, where n is a positive integer, that is, the first resource is used to transmit an integer number of data units carried on the logical channel.

Therefore, a method for allocating logical channel resources in an embodiment of the present application allocates resources to a logical channel that does not have a function of segmenting a data unit, and the allocated resources are satisfied to be larger than or equal to sizes of an integer number of data units and smaller than a size of PBR*TTI of the logical channel, thus realizing a rapid allocation of resources to a logical channel that a function of segmenting is disabled, and also making more efficient use of granted resources.

It should be understood that the technical solutions of embodiments of the present application can be applied to various communication systems, such as a Global System of Mobile communication (GSM) system, a Code Division Multiple Access (CDMA) system, a Wideband Code Division Multiple Access (WCDMA) system, General Packet Radio Service (GPRS), a LTE system, a LTE Frequency Division Duplex (FDD) system, LTE Time Division Duplex (TDD), a Universal Mobile Telecommunication System (UMTS), or a Worldwide Interoperability for Microwave Access (WiMAX) communication system, etc.

In an embodiment of the present application, a terminal device may include, but is not limited to, a mobile station (MS), a mobile terminal, a mobile telephone, a user equipment (UE), a handset and a portable equipment, a vehicle, etc. The terminal device can communicate with one or more core networks via a Radio Access Network (RAN), for example, the terminal device can be a mobile phone (or referred to as a "cellular" telephone), a computer with wireless communication capabilities, etc. The terminal device can also be portable, pocket-sized, handheld, computer-integrated or in-vehicle mobile apparatus.

In S110, determining a priority of at least one logical channel and total resources allocated to the at least one logical channel, the at least one logical channel includes a first logical channel, and the first logical channel does not have a function of segmenting a data unit. The at least one logical channel may further include a second logical channel that has a function of segmenting a data unit.

It should be understood that the first logical channel does not have a function of segmenting a data unit, that is, the segmentation function of the logical channel is disabled, and correspondingly, the second logical channel has a function of segmenting a data unit, that is, the segmentation function of the logical channel is enabled. Enabling and disabling the segmentation function may be non-configurable, that is, the first logical channel all disables the segmentation function by default under any conditions, and the second logical channel all enables the segmentation function by default under any conditions, but embodiments of the present application are not limited thereto.

It should be understood that the data unit may be an RLC SDU, or an RLC PDU after the RLC SDU is encapsulated, and the RLC PDU may include a PDU header and an RLC SDU; or the data unit may be other forms of data units. Embodiments of the present application are not limited thereto. For convenience of description, an RLC SDU is taken as an example in the following embodiments.

In S120, allocating a first resource in the total resources to the first logical channel according to a priority of the first logical channel and data units carried on the first logical channel, the first resource is used to transmit n data units carried on the first logical channel, a size of the first resource is larger than or equal to a size of the n data units, and the size of the first resource is smaller than or equal to a product of a PBR and a TTI of the first logical channel, and n is a positive integer. In S130, transmitting the n data units by the first resource.

It should be understood that for any one logical channel of the at least one logical channel, the logical channel may include a plurality of data units. For example, as shown in FIG. 1, the logical channel includes three data units, which are respectively RLC SDU a, RLC SDU b and RLC SDU c. That is, the first logical channel may also include at least one logical channel, and according to the priority of the first logical channel and data units carried on the first logical channel, a first resource may be allocated to the first logical channel, and may transmit n data units carried on the first logical channel, where the n data units may be all or part of the logical channels of the first logical channel.

Considering resource utilization, the first resource allocated to the logical channel should also satisfy that: a size of the n+1 data units carried on the first logical channel is larger than a size of the first resource, that is, the determined value of n is a maximum value that allows the first resource to be fully utilized.

It should be understood that when the first resource allocated to the first logical channel is larger than the size of the n data units, the padding bits may be used since the logical channel cannot segment the data units. That is to say, the n data units carried on the first logical channel and first padding bits are transmitted by the first resource, a size of the first padding bits is equal to the difference between the size of the first resource and the size of the n data units.

In an embodiment of the present application, for the second logical channel that has a function of segmenting a data unit in the at least one logical channel, the terminal device may further allocate a second resource for transmitting m data units carried on the second logical channel in the total resources to the second logical channel according to the priority of the second logical channel and the data unit carried on the second logical channel, a size of the m data units is equal to a size of the second resource, and m is a positive number.

It should be understood that m being a positive number includes that m may be a positive integer, or m may be a decimal, wherein when the m is a decimal, it indicates a ratio of segmentation for a logical channel. For example, m=2.5 indicates that the second resource transmits two complete data units and one half of a third data unit, that is, the third data unit is segmented and then is transmitted.

In an embodiment of the present application, since the at least one logical channel includes a first logical channel that does not have a function of segmenting a data unit, and further may include a second logical channel that has a function of segmenting a data unit, therefore, when the resource is allocated to the at least one logical channel, the allocation may be performed according to a priority of the at least one logical channel and a size of data units carried on each logical channel.

Optionally, as an embodiment, when the at least one logical channel only includes one logical channel that does not have a function of segmenting a data unit, the terminal device allocates all granted resources to the logical channel, and the resource may transmit a maximum integer number of data units carried on the logical channel. Since the logical channel cannot segment a data unit, for remaining resources, they can be filled by the padding bits.

Figure 3:
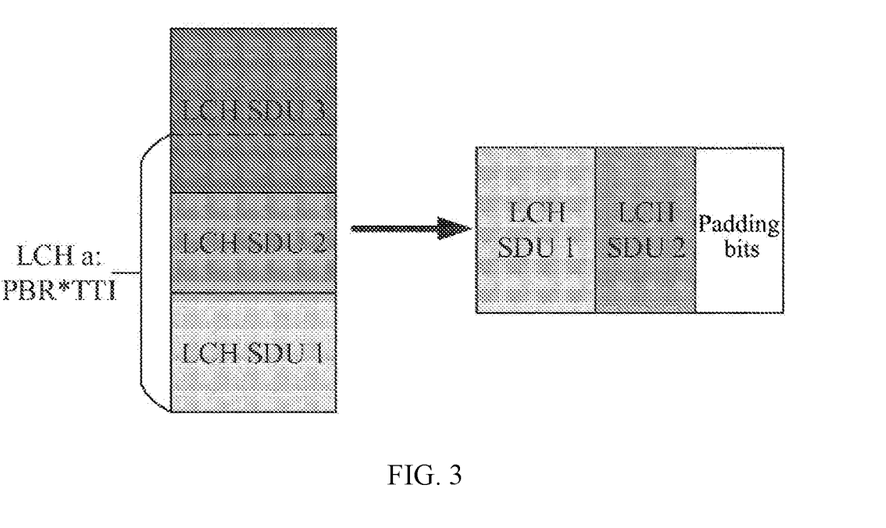
FIG. 3 is a schematic diagram of allocating resources to one logical channel according to an embodiment of the present application.

For example, FIG. 3 shows a schematic diagram of allocating resources to one logical channel according to an embodiment of the present application. Specifically, the terminal device allocates resources to the first logical channel that does not have a function of segmenting a data unit. As shown in FIG. 3, the first logical channel may be represented as LCH a, and the LCH a may include multiple data units. For example, in FIG. 3, the LCH a including three data units is taken as an example, which are respectively represented as LCH SDU 1, LCH SDU 2, and LCH SDU 3.

Since only one logical channel LCH a is included, granted resources of the terminal device are all used to transmit data carried on the LCH a, and it is assumed that the granted resource allocated by the terminal device is equal to the value of PBR*TTI of the LCH a, that is, the size of the first resource allocated to the first logical channel is equal to PBR*TTI of the first logical channel, and a size of PBR*TTI is as shown in FIG. 3, that is to say, the size of the first resource is larger than the sum of the sizes of the LCH SDU 1 and the LCH SDU 2, and the size of the first resource is smaller than the sum of sizes of the three data units of the LCH SDU 1, the LCH SDU 2, and the LCH SDU 3.

Therefore, the first resource can be used to transmit at most the two data units LCH SDU 1 and LCH SDU 2 carried on the first logical channel LCH a, and remaining part of resources are filled by the padding bits since the first logical channel does not have a function of segmenting a data unit.

Optionally, as an embodiment, the at least one logical channel may be a plurality of logical channels which all do not have logical channel that has a function of segmenting a data unit, and the terminal device may refer to an existing LCP rule and allocate resources to each logical channel according to the priorities of the plurality of logical channels, and when there are two or more logical channels having a same priority among the plurality of logical channels, resource allocation may be performed according to a principle that allows padding bits to be minimum, that is, sizes of padding bits corresponding to resource allocation performed according to different sequences are calculated respectively, a minimum value of the padding bits is determined, and resource allocation is performed according to the corresponding resource allocation method.

Figure 4:
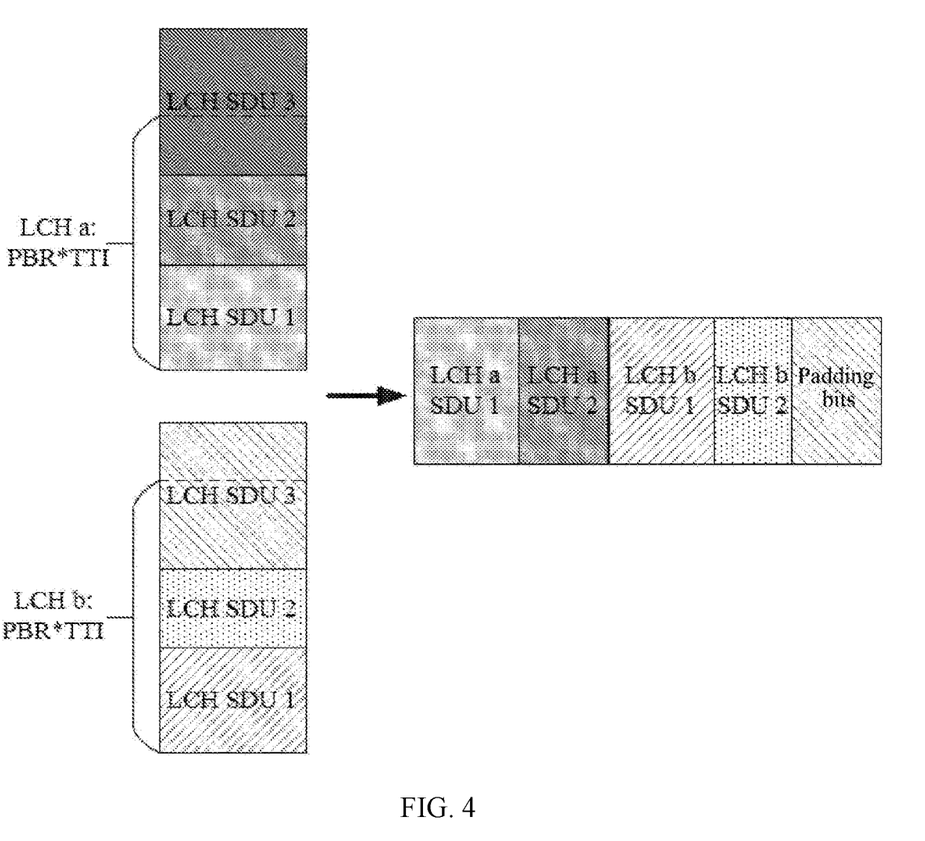
FIG. 4 is a schematic diagram of allocating resources to two logical channels according to an embodiment of the present application.

Here taking two logical channels that do not have a function of segmenting a data unit as an example, the at least one logical channel includes a first logical channel and a third logical channel, neither the first logical channel nor the third logical channel can segment a data unit, and a priority of the first logical channel is equal to a priority of the third logical channel. Specifically, FIG. 4 shows a schematic diagram of allocating resources to two logical channels according to an embodiment of the present application, where the first logical channel is represented as LCH a, and the third logical channel is represented as LCH b, and the priority of LCH a and the priority of LCH b are equal. Both LCH a and LCH b may include a plurality of data units. Here taking both LCH a and LCH b including three data units as an example for illustration, as shown in FIG. 4, the three data units included in LCH a and LCH b are respectively represented as LCH SDU 1, LCH SDU 2, and LCH SDU 3.

When the terminal device allocates the granted resources to LCH a and LCH b, since the priority of LCH a and priority of LCH b are equal, therefore, it may respectively calculate a size of first padding bits needed when resources are firstly allocated to LCH a and then allocated to the LCH b and a size of second padding bits needed when resources are firstly allocated to LCH b and then allocated to LCH a. By comparing the size of the first padding bits and the size of the second padding bits, resources are allocated according to the allocation scheme corresponding to less padding bits.

It is assumed here that values of PBR*TTI of LCH a and LCH b are respectively as shown in FIG. 4, that is, both of the values of PBR*TTI of LCH a and LCH b are satisfied to be larger than a size of two data units and smaller than a size of three data units. The terminal device calculates the size of the first padding bits needed when resources are firstly allocated to LCH a and then allocated to LCH b. Since neither LCH a nor LCH b has a function of segmenting a data unit, the resources firstly allocated to LCH a may be smaller than or equal to a size of PBR*TTI of the LCH a. According to the size of PBR*TTI of LCH a, the size of the resources allocated to LCH a is equal to the size of two data units, and then the remaining resources are allocated to LCH b. Assuming that the remaining resources are larger than the sum of sizes of two data units LCH SDU 1 and LCH SDU 2 in LCH b and smaller than the sum of sizes of three data units LCH SDU 1, LCH SDU 2 and LCH SDU 3, the remaining resources can be used to transmit the two data units LCH SDU 1 and LCH SDU 2 of LCH b, and the rest is filled by the first padding bits, thus the size of the first padding bits are determined. Similarly, the terminal device can also calculate the size of the second padding bits needed when resources are firstly allocated to LCH b and then allocated to LCH a.

The size of the first padding bits is compared to the size of the second padding bits. If the first padding bits are smaller than the second padding bits, resources are firstly allocated to LCH a, and then allocated to LCH b; if the second padding bits are smaller than the first padding bits, resources are firstly allocated to LCH b and then allocated to LCH a.

Optionally, as an embodiment, when at least one logical channel to which resources are allocated by the terminal device includes both a logical channel that has a function of segmenting a data unit and a logical channel that does not have function of segmenting a data unit, resources can be allocated to logical channels according to the priority. The following is an example in which the at least one logical channel includes two logical channels, which are a first logical channel that does not have the function of segmenting a data unit and a second logical channel that has the function of segmenting a data unit.

Figure 5:
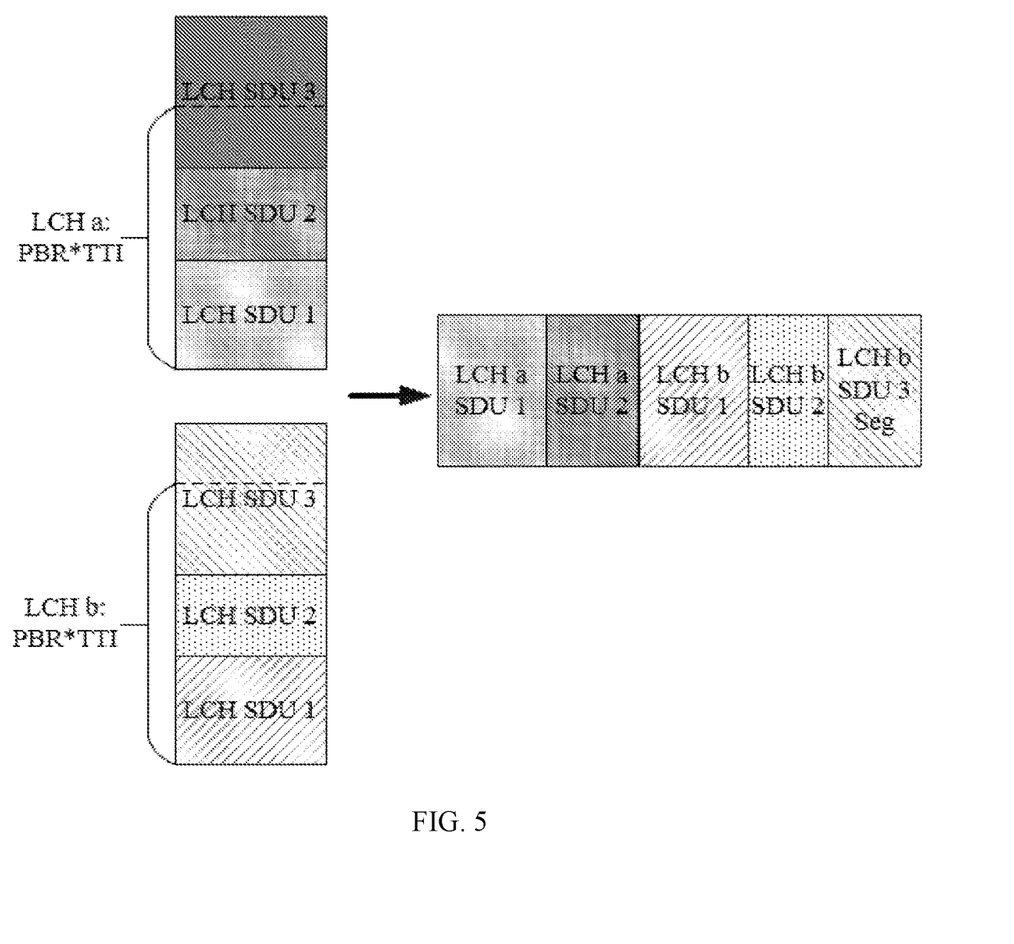
FIG. 5 is another schematic diagram of allocating resources to two logical channels according to an embodiment of the present application.

Optionally, as an embodiment, when a priority of the first logical channel is larger than or equal to a priority of the second logical channel, resources are preferentially allocated to the first logical channel, and then resources are allocated to the second logical channel. Specifically, FIG. 5 shows another schematic diagram of allocating resources to two logical channels according to an embodiment of the present application, where the first logical channel is represented as LCH a, the second logical channel is represented as LCH b, and a priority of LCH a and a priority of LCH b are equal, or a priority of LCH a is larger than a priority of LCH b. Both LCH a and LCH b may include a plurality of data units. Here taking both LCH a and LCH b including three data units as an example for illustration, as shown in FIG. 5, the three data units included in LCH a and LCH b are respectively represented as LCH SDU 1, LCH SDU 2, and LCH SDU 3.

When allocating granted resources to LCH a and LCH b, the terminal device preferentially allocates resources to the first logical channel LCH a and then to the second logical channel LCH b. Specifically, a size of a first resource allocated to LCH a satisfied to be: smaller than or equal to PBR*TTI of LCH a and equal to a size of a maximum integer number of data units. As shown in FIG. 5, since the value of PBR*TTI of LCH a is larger than the sum of sizes of the two data units LCH SDU 1 and LCH SDU 2, and is smaller than the sum of sizes of the three data units LCH SDU 1, LCH SDU 2, and LCH SDU 3, thus the size of the first resource allocated to LCH a is equal to the sum of the sizes of LCH SDU 1 and LCH SDU 2.

After allocating the first resource to the first logical channel LCH a, then the terminal device allocates the remaining resources except the first resource in the total resources to the second logical channel LCH b. Since LCH b has a segmentation function, therefore a size of a second resource that can be allocated to LCH b is equal to the value of PBR*TTI of LCH b. If the remaining resources are smaller than PBR*TTI, all the remaining resources are allocated to LCH b. For the second resource allocated to LCH b, assuming that a size of the second resource is equal to the PBR*TTI, and as shown in FIG. 5, the PBR*TTI is larger than the sum of sizes of the two data units LCH SDU 1 and LCH SDU 2 in the LCH b and smaller than the sum of sizes of the three data units LCH SDU 1, LCH SDU 2 and LCH SDU 3, since LCH b has a segmentation function, therefore data units of LCH b can be segmented according to a size of PBR*TTI. That is to say, the second resource transmits LCH SDU 1, LCH SDU 2 and segmented portion LCH SDU 3 Seg of LCH SDU 3 carried on LCH b. Similarly, when the second resource is smaller than the PBR*TTI, segmentation can also be performed on LCH b according to the size of the second resource.

By analogy, if the at least one logical channel includes multiple first logical channels and multiple second logical channels, and the priorities of the first logical channels are larger than or equal to the priorities of the second logical channels, similar to the above allocation scheme, it is always to preferentially allocate for the first logical channels that does not have the function of segmenting a data unit and then to allocate for the second logical channels that has the function of segmenting a data unit.

Figure 6:
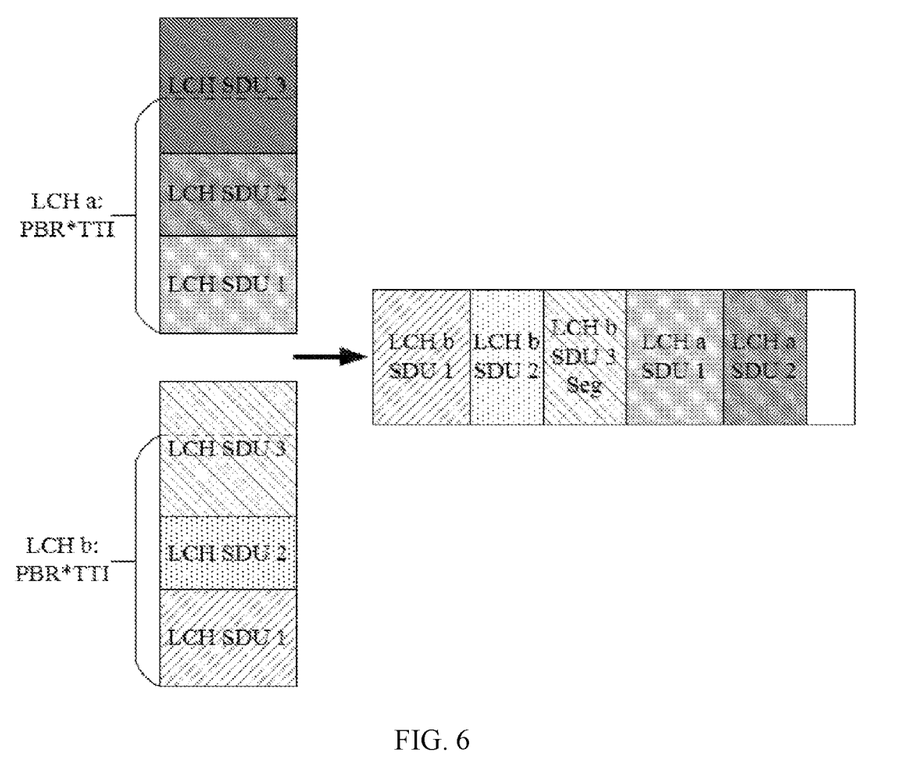
FIG. 6 is still another schematic diagram of allocating resources to two logical channels according to an embodiment of the present application.

Optionally, as an embodiment, when a priority of a first logical channel is smaller than a priority of a second logical channel, resources are allocated firstly to the second logical channel and then to the first logical channel according to the priority sequence. Specifically, FIG. 6 shows still another schematic diagram of allocating resources to two logical channels according to an embodiment of the present application, where the first logical channel is represented as LCH a, and the second logical channel is represented as LCH b, and a priority of LCH a is smaller than a priority of LCH b. Both LCH a and LCH b may include a plurality of data units. Here taking both LCH a and LCH b including three data units as an example for illustration, as shown in FIG. 6, the three data units included in LCH a and LCH b are respectively represented as LCH SDU I, LCH SDU 2, and LCH SDU 3.

When allocating granted resources to LCH a and LCH b, the terminal device preferentially allocates resources to the second logical channel LCH b and then to the first logical channel LCH a. Specifically, since LCH b has a segmentation function, the second resource may be allocated to LCH b according to the size of PBR*TTI, that is, the size of the second resource is equal to the size of PBR*TTI. As shown in FIG. 6, assuming that PBR*TTI of LCH b is larger than the sum of sizes of the two data units LCH SDU 1 and LCH SDU 2 in LCH b, and is smaller than the sum of sizes of the three data units LCH SDU 1, LCH SDU 2 and LCH SDU 3, then data units of LCH b are segmented according to a size of the PBR*TTI. That is to say, the second resource transmits LCH SDU 1, LCH SDU 2 and a segmented portion LCH SDU 3 Seg of the LCH SDU 3 carried on LCH b.

After the terminal device allocates the second resource to the second logical channel LCH b, then the remaining resources except the second resource in the total resource are allocated to the first logical channel LCH a. If a size of the remaining resource is smaller than or equal to the size of PBR*TTI of LCH a, then a size of the first resource allocated to LCH a is equal to a maximum integer number of data units carried on LCH a, and the size of the maximum integer number of data units carried on LCH a is smaller than or equal to the remaining resources; if the size of the remaining resource is larger than the size of the PBR*TTI of LCH a, then the size of the first resource allocated to LCH a is equal to a maximum integer number of data units carried on LCH a, and the size of the maximum integer number of data units carried on LCH a is smaller than or equal to the size of the PBR*TTI of LCH a.

For example, as shown in FIG. 6, assuming that the size of the remaining resources except the second resource in the total resources is equal to two data units carried on LCH a, or larger than two data units carried on LCH a and smaller than three data units carried on LCH a, then the first resource allocated to LCH a is used to transmit two data units LCH SDU 1 and LCH SDU 2 carried on LCH a.

If there are still remaining resources in the total resources after the second resource and the first resource are allocated according to the above procedure, then the resources are continued to be allocated to LCH b. Specifically, as shown in FIG. 6, assuming that there still exist remaining resources in the total resources except the second resource and the first resource, then a third resource is continued to be allocated to LCH b. If the remaining resources are smaller than a size of data units that are included in LCH b and are not transmitted, then a size of the third resource is equal to a size of the remaining resources, that is, data units of LCH b can be segmented according to the size of the remaining resources so that the remaining resources are fully utilized; if the remaining resources are large enough and can transmit all data units that are included in LCH b and are not transmitted, that is, there still exists remaining resources in the remaining resources after the third resource for transmitting all data units carried on LCH b is allocated to the LCH b, then a fourth resource can be continued to be allocated to LCH a.

When the terminal device allocates the fourth resource to LCH a, if the fourth resource can transmit an integer number of data units carried on LCH a, a maximum integer number of data units are transmitted according to a size of the fourth resource; if there still exist remaining resources after the integer number of data units is transmitted and the remaining resources are insufficient to transmit other data units carried on the LCH a, it can be filled by the padding bits, but embodiments of the present application are not limited thereto.

It should be understood that, in embodiments of the present application, the location of a MAC subheader is not limited. That is to say, the location and size of the MAC subheader may change according to the discussion of standardization, and embodiments of the present application are not limited thereto.

Therefore, the method for allocating logical channel resources provided in embodiments of the present application, according to priority of logical channel, can allocate the resources to a logical channel that does not have a function of segmenting a data unit, and the allocated resources satisfies to be larger than or equal to sizes of an integer number of data units and smaller than the size of PBR*TTI of the logical channel, and it is also possible to allocate resources to a logical channel that has a function of segmenting a data unit, thus realizing a rapid allocation of resources to a logical channel that a function of segmenting is disabled, and improving the efficiency of resource allocation while ensuring more efficient use of granted resources.

It should be understood that, in various embodiments of the present application, sizes of serial numbers of each of the processes described above do not mean an order of execution, and the order of execution of each of process should be determined by its function and internal logic, and should not constitutes any limitation to the implementation process of embodiments of the present application.

The method for allocating logical channel resources according to embodiments of the present application is described in detail above with reference to FIG. 1 to FIG. 6. The terminal device according to embodiments of the present application will be described below with reference to FIG. 7 to FIG. 8.

Figure 7:
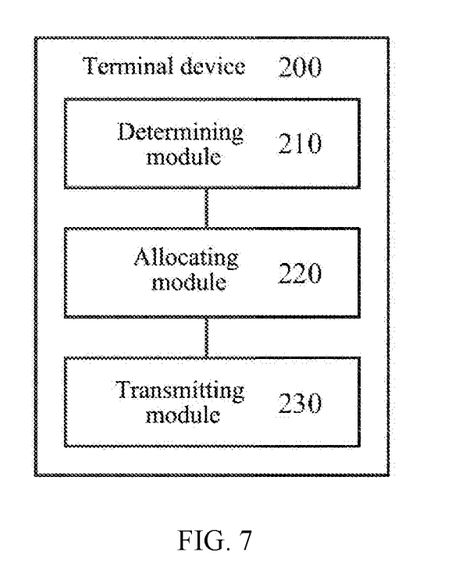
FIG. 7 is a schematic block diagram of a terminal device according to an embodiment of the present application.

As shown in FIG. 7, a terminal device 200 according to an embodiment of the present application includes:

a determining module 210 configured to determine a priority of at least one logical channel and total resources allocated to the at least one logical channel, the at least one logical channel includes a first logical channel that does not have a function of segmenting a data unit;

an allocating module 220 configured to allocate a first resource in the total resources to the first logical channel according to a priority of the first logical channel and data units carried on the first logical channel, the first resource is used to transmit n data units carried on the first logical channel, a size of the first resource is larger than or equal to a size of the n data units, and the size of the first resource is smaller than or equal to a product of a priority bit rate (PBR) and a transmission time interval (TTI) of the first logical channel, and n is a positive integer;

a transmitting module 230 configured to transmit the n data units by the first resource.

Therefore, the terminal device provided in an embodiment of the present application allocates resources to a logical channel that does not have a function of segmenting a data unit, and the allocated resources are satisfied to be larger than or equal to sizes of an integer number of data units and smaller than a size of PBR*TTI of the logical channel, thus realizing a rapid allocation of resources to a logical channel that a function of segmenting is disabled, and also making more efficient use of granted resources.

Optionally, as an embodiment, a size of n+1 data units carried on the first logical channel is larger than the size of the first resource.

Optionally, as an embodiment, the at least one logical channel includes a second logical channel, the second logical channel has a function of segmenting a data unit, and the allocating module 220 is further configured to: allocate a second resource for transmitting m data units carried on the second logical channel in the total resources to the second logical channel according to a priority of the second logical channel and data units carried on the second logical channel, a size of the m data units is equal to a size of the second resource, and m is a positive number.

Optionally, as an embodiment, the size of the n data units is smaller than the size of the first resource, and the transmitting module 230 is configured to: transmit, by the first resource, the n data units carried on the first logical channel and first padding bits, a size of the first padding bits is equal to the difference between the size of the n data units and the size of the first resource.

Optionally, as an embodiment, the priority of the first logical channel is larger than or equal to the priority of the second logical channel, and the allocating module 220 is specifically configured to: allocate, at a first moment, the first resource having a size equal to a size of the n data units to the first logical channel according to data units carried on the first logical channel, and the size of n+1 data units carried on the first logical channel is larger than the product of a PBR and a TTI of the first logical channel; and allocate, at a second moment, a second resource to the second logical channel according to the size of the first resource and the data units carried on the second logical channel, the second resource is all or part resources of remaining resources except the first resource in the total resource, and the second moment is after the first moment.

Optionally, as an embodiment, if the priority of the first logical channel is smaller than the priority of the second logical channel, the second resource is allocated to the second logical channel at a third moment, the size of the second resource is equal to a product of a PBR and a TTI of the second logical channel, and the first resource is allocated to the first logical channel at a fourth moment, the third moment is before the fourth moment.

Optionally, as an embodiment, the allocating module 220 is configured to: allocate, at the fourth moment, the first resource having a size equal to a size of the n data units to the first logical channel according to data units carried on the first logical channel, and the size of n+1 data units carried on the first logical channel is larger than the product of the PBR and the TTI of the first logical channel, the first resource is all or part resources of remaining resources except the second resource in the total resources; allocate, at a fifth moment, a third resource to the second logical channel, the fifth moment is after the fourth moment, the third resource is all or part resources of remaining resources except the first resource and the second resource in the total resources.

Optionally, as an embodiment, the allocating module 220 is specifically configured to: allocate, at a sixth moment, a fourth resource to the first logical channel, the sixth moment is after the fifth moment, the fourth resource is the remaining resources except the first resource, the second resource, and the third resource in the total resources.

Optionally, as an embodiment, the at least one logical channel includes a third logical channel that does not have a function of segmenting a data unit, a priority of the first logical channel is equal to a priority of the third logical channel, and the determining module 210 is specifically configured to: determine a difference between the size of the n data units and the size of the first resource to be a size of first padding bits, if a fifth resource having a size equal to a size of l data units carried on the third logical channel is firstly allocated to the third logical channel and then the first resource having a size larger than the size of the n data units is allocated to the first logical channel, the size of the fifth resource is smaller than or equal to a product of PBR and TTI of the third logical channel; and determine a difference between the size of the l data units and the size of the fifth resource to be a size of second padding bits, if the first resource having a size equal to the size of the n data units is firstly allocated to the first logical channel and then the fifth resource having a size larger than the size of the l data units is allocated to the third logical channel; the allocating module 220 is specifically configured to: firstly allocate the fifth resource having a size equal to the size of the l data units to the third logical channel and then allocate the first resource having a size larger than the size of the n data units to the first logical channel, when the size of the first padding bits is smaller than the size of the second padding bits; firstly allocate the first resource having a size equal to the size of the n data units to the first logical channel and then allocate the fifth resource having a size larger than the size of the l data units to the third logical channel, when the size of the first padding bits is larger than the size of the second padding bits.

It should be understood that the terminal device 200 according to embodiments of the present application may correspondingly perform the method 100 in embodiments of the present application, and the above described and other operations and/or functions of the respective modules in the terminal device 200 are respectively for implementing the corresponding processes of the terminal devices in the respective methods in FIG. 1 to FIG. 6, which are not described herein for brevity.

Therefore, the terminal device in embodiments of the present application may, according to priorities of logical channels, allocate resources to a logical channel that does not have a function of segmenting a data unit, and the allocated resources are satisfied to be larger than or equal to sizes of an integer number of data units and smaller than a size of PBR*TTI of the logical channel, and also allocate resources to a logical channel having a function of segmenting a data unit, thus realizing a rapid allocation of resources to a logical channel that a function of segmenting is disabled, and improving the efficiency of resource allocation while ensuring more efficient use of granted resources.

Figure 8:
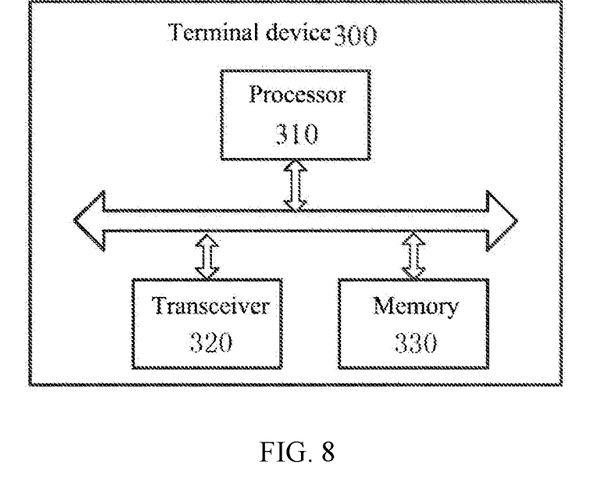
FIG. 8 is a schematic block diagram of a terminal device according to another embodiment of the present application.

FIG. 8 shows a schematic block diagram of a terminal device 300 according to an embodiment of the present application. As shown in FIG. 8, the terminal device 300 includes a processor 310 and a transceiver 320. The processor 310 is connected to the transceiver 320. Optionally, the terminal device 300 further includes a memory 330 which is connected to the processor 310. Wherein, the processor 310, the memory 330, and the transceiver 320 communicate with each other through an internal connection path, transmit control and/or data signals. The memory 330 can be used to store instructions, and the processor 310 is used to execute instructions stored in the memory 330 for controlling the transceiver 320 to transmit information or a signal, and the processor 310 is configured to: determine a priority of at least one logical channel and total resources allocated to the at least one logical channel, the at least one logical channel includes a first logical channel that does not have a function of segmenting a data unit; allocate a first resource in the total resources to the first logical channel according to a priority of the first logical channel and data units carried on the first logical channel, the first resource is used to transmit n data units carried on the first logical channel, a size of the first resource is larger than or equal to a size of the n data units, and the size of the first resource is smaller than or equal to a product of a priority bit rate (PBR) and a transmission time interval (TTI) of the first logical channel, and n is a positive integer; the transceiver 320 is configured to transmit the n data units by the first resource.

Therefore, the terminal device in embodiments of the present application allocates resources to a logical channel that does not have a function of segmenting a data unit, and the allocated resources are satisfied to be larger than or equal to sizes of an integer number of data units and smaller than a size of PBR*TTI of the logical channel, thus realizing a rapid allocation of resources to a logical channel that a function of segmenting is disabled, and also making more efficient use of granted resources.

Optionally, as an embodiment, a size of n+1 data units carried on the first logical channel is larger than the size of the first resource.

Optionally, as an embodiment, the at least one logical channel includes a second logical channel, the second logical channel has a function of segmenting a data unit, and the processor 310 is configured to: allocate a second resource for transmitting m data units carried on the second logical channel in the total resources to the second logical channel according to a priority of the second logical channel and data units carried on the second logical channel, a size of the m data units is equal to a size of the second resource, and m is a positive number.

Optionally, as an embodiment, the size of the n data units is smaller than a size of the first resource, and the transceiver 320 is configured to: transmit, by the first resource, the n data units carried on the first logical channel and first padding bits, a size of the first padding bits is equal to a difference between the size of the n data units and the size of the first resource.

Optionally, as an embodiment, the priority of the first logical channel is larger than or equal to the priority of the second logical channel, and the processor 310 is configured to: allocate, at a first moment, the first resource having a size equal to a size of the n data units to the first logical channel, according to the data carried on the first logical channel, and the size of n+1 data units carried on the first logical channel is larger than the product of a PBR and a TTI of the first logical channel; and allocate, at a second moment, a second resource to the second logical channel, according to the size of the first resource and the data units carried on the second logical channel, the second resource is all or part resources of remaining resources except the first resource in the total resources, and the second moment is after the first moment.

Optionally, as an embodiment, if the priority of the first logical channel is smaller than the priority of the second logical channel, the second resource is allocated to the second logical channel at a third moment, the size of the second resource is equal to a product of a PBR and a TTI of the second logical channel, and the first resource is allocated to the first logical channel at a fourth moment, the third moment is before the fourth moment.

Optionally, as an embodiment, the processor 310 is configured to: allocate, at the fourth moment, the first resource having a size equal to a size of the n data units to the first logical channel according to data units carried on the first logical channel, and the size of n+1 data units carried on the first logical channel is larger than the product of a PBR and a TTI of the first logical channel, the first resource is all or part resources of remaining resources except the second resource in the total resources; and allocate, at a fifth moment, a third resource to the second logical channel, the fifth moment is after the fourth moment, the third resource is all or part resources of remaining resources except the first resource and the second resource in the total resources.

Optionally, as an embodiment, the processor 310 is configured to: allocate, at a sixth moment, a fourth resource to the first logical channel, the sixth moment is after the fifth moment, the fourth resource is the remaining resources except the first resource, the second resource, and the third resource in the total resources.

Optionally, as an embodiment, the at least one logical channel includes a third logical channel that does not have a function of segmenting a data unit, a priority of the first logical channel is equal to a priority of the third logical channel, and the processor 310 is configured to: determine a difference between the size of the n data units and the size of the first resource to be a size of first padding bits, if a fifth resource having a size equal to a size of l data units carried on the third logical channel is firstly allocated to the third logical channel and then the first resource having a size larger than a size of the n data units is allocated to the first logical channel, the size of the fifth resource is smaller than or equal to a product of a PBR and a TTI of the third logical channel; and determine a difference between the size of the l data units and the size of the fifth resource to be a size of second padding bits, if the first resource having a size equal to the size of the n data units is firstly allocated to the first logical channel and then the fifth resource having a size larger than a size of the l data units is allocated to the third logical channel; the processor 310 is configured to: firstly allocate the fifth resource having a size equal to the size of the l data units to the third logical channel and then allocate the first resource having a size larger than the size of the n data units to the first logical channel, when the size of the first padding bits is smaller than the size of the second padding bits; firstly allocate the first resource having a size equal to a size of the n data units to the first logical channel and then allocate the fifth resource having a size larger than the size of the l data units to the third logical channel, when the size of the first padding bits is larger than the size of the second padding bits.

It should be understood that the terminal device 300 according to embodiments of the present application may correspond to the terminal device 200 in embodiments of the present application, and may correspond to the corresponding subject performing the method 100 according to embodiments of the present application, and the above described and other operations and/or functions of the respective units in the terminal device 300 are respectively for implementing the corresponding processes of the terminal device in the respective methods in FIG. 1 to FIG. 6, which are not described herein for brevity.

Therefore, the terminal device in embodiments of the present application may, according to priorities of logical channels, allocate resources to a logical channel that does not have a function of segmenting a data unit, and the allocated resources are satisfied to be larger than or equal to sizes of an integer number of data units and smaller than a size of PBR*TTI of the logical channel, and also allocate resources to a logical channel having a function of segmenting a data unit, thus realizing a rapid allocation of resources to a logical channel that a function of segmenting is disabled, and improving the efficiency of resource allocation while ensuring more efficient use of granted resources.

It should be noted that embodiments of the above method of the present application may be applied to a processor or implemented by a processor. The processor may be an integrated circuit chip with signal processing capabilities. In the implementation process, each step of the above embodiments of the method may be completed by an integrated logic circuit of hardware in a processor or by an instruction in a form of software. The above processor may be a general-purpose processor, a digital signal processor (DSP), an application specific integrated circuit (ASIC), a Field Programmable Gate Array (FPGA) or other programmable logic devices, discrete gates or transistor logic devices, and discrete hardware components, and can implement or execute the methods, steps, and logic blocks disclosed in embodiments of the present application. A general-purpose processor may be a microprocessor or the processor may be any conventional processor or the like. The steps in combination with the method disclosed in the embodiments of the present application may be directly implemented as being completed through performed by a hardware decoding processor, or being completed through performed by a combination of hardware and software modules in a decoding processor. The software modules can be located in a conventional storage medium in the prior art such as random access memory, flash memory, read only memory, programmable read only memory or electrically erasable programmable memory, registers, and the like. The storage medium is located in the memory, and the processor reads the information in the memory and combines its hardware to complete the steps of the above method.

It is understood that the memory in the embodiments of the present application may be a volatile memory or a non-volatile memory, or may include both volatile memory and non-volatile memory. The non-volatile memory may be a read-only memory (ROM), a programmable read only memory (PROM), an erasable programmable read only memory (Erasable PROM, EPROM), or an electrically erasable programmable read only memory (EEPROM) or flash memory. The volatile memory can be a Random Access Memory (RAM) that acts as an external cache. By way of examples, but not as limitations, many forms of RAM are available, such as static random access memory (SRAM), dynamic random access memory (DRAM), Synchronous DRAM (SDRAM), Double Data Rate SDRAM (DDR SDRAM), Enhanced Synchronous Dynamic Random Access Memory (ESDRAM), Synchronous-Link Dynamic Random Access Memory (SLDRAM) and Direct Rambus RAM (DR RAM). It should be noted that the memories of the systems and methods described herein are intended to including, without being limited to, these and any other suitable types of memories.

Persons of ordinary skill in the art will appreciate that elements and algorithm steps of various examples described with reference to the embodiments disclosed herein can be implemented in electronic hardware or a combination of computer software and electronic hardware. Whether these functions are performed in hardware or software depends on the specific application and design constraints of the solution. A person skilled in the art can use different methods for implementing the described functions for each particular application, but such implementation should not be considered to go beyond the scope of the present application.

A person skilled in the art can clearly understand that for the convenience and brevity of the description, the specific working process of the system, the device and the unit described above can refer to the corresponding process in the above embodiments of the method, and details are not described herein.

In the several embodiments provided by the present application, it should be understood that the disclosed systems, devices, and methods may be implemented in other manners. For example, embodiments of the apparatus described above are merely illustrative. For example, the division of the unit is only a division in logical functions. In actual implementation, there may be another division manner, and for example, multiple units or components may be combined or can be integrated into another system, or some features can be ignored or not executed. In addition, the coupling or direct coupling or communication connection therebetween shown or discussed herein may be an indirect coupling or communication connection through some interface, device or unit, and may be electrical, mechanical or otherwise.

The units described as separate components may or may not be physically separated, and the components displayed as units may or may not be physical units, that is, may be located in one place, or may be distributed to multiple network units. Some or all of the units may be selected according to actual needs to achieve the purpose of the solution of the embodiment.

In addition, each of functional units in each of embodiments of the present application may be integrated into one processing unit, or each unit may exist physically separately, or two or more units may be integrated into one unit.

The functions may be stored in a computer readable storage medium if implemented in the form of a software functional unit and sold or used as a standalone product. Based on such understanding, the technical solution of the present application substantially or the part making contributions relative to the prior art or part of the technical solution, may be embodied in the form of a software product, wherein the computer software product is stored in a storage medium and includes some instructions to cause a computer device (which may be a personal computer, server, or network device, etc.) to perform all or part of the steps of the methods described in various embodiments of the present application. The foregoing storage medium includes various mediums which can store program codes: a U disk, a mobile hard disk, a read-only memory (ROM), a random access memory (RAM), a magnetic disk, or an optical disk, and the like.

The above description are only specific implementations of the present application, but the protection scope of the present application is not limited thereto, and any person skilled in the art can easily think of changes or substitutions within the technical scope disclosed in the present application, which should be covered by the protection scope of this application. Therefore, the protection scope of the present application should be defined by the protection scope of the claims.

What is claimed is:

1. A method for allocating logical channel resources, comprising:
    determining a priority of at least one logical channel and total resources allocated to the at least one logical channel, the at least one logical channel comprises a first logical channel that does not have a function of segmenting a data unit;
    allocating a first resource in the total resources to the first logical channel according to a priority of the first logical channel and data units carried on the first logical channel, the first resource is used to transmit n data units carried on the first logical channel, a size of the first resource is larger than or equal to a size of the n data units and the size of the first resource is smaller than or equal to a product of a priority bit rate (PBR) and a transmission time interval (TTI) of the first logical channel, and n is a positive integer; and
    transmitting the n data units by the first resource;
    wherein the at least one logical channel comprises a second logical channel that has the function of segmenting the data unit, the method further comprising:
    allocating a second resource for transmitting m data units carried on the second logical channel in the total resources to the second logical channel according to a priority of the second logical channel and data units carried on the second logical channel, a size of the m data units is equal to a size of the second resource, and m is a positive number;
    wherein if the priority of the first logical channel is smaller than the priority of the second logical channel, allocating, at a third moment, the second resource to the second logical channel, the size of the second resource is equal to a product of a PBR and a TTI of the second logical channel, and allocating, at a fourth moment, the first resource to the first logical channel, the third moment is before the fourth moment.

2. The method according to claim 1, wherein a size of n+1 data units carried on the first logical channel is larger than the size of the first resource.

3. The method according to claim 1, wherein the size of the n data units is smaller than the size of the first resource, and
the transmitting the n data units by the first resource comprises:
transmitting, by the first resource, the n data units carried on the first logical channel and first padding bits, and a size of the first padding bits is equal to a difference between the size of the n data units and the size of the first resource.

4. The method according to claim 1, wherein the priority of the first logical channel is larger than or equal to the priority of the second logical channel,
the allocating a first resource in the total resources to the first logical channel according to a priority of the first logical channel and data units carried on the first logical channel comprises:
allocating, at a first moment, the first resource having a size equal to the size of the n data units to the first logical channel according to the data units carried on the first logical channel, and the size of the n+1 data units carried on the first logical channel is larger than the product of the PBR and the III of the first logical channel;
the allocating a second resource in the total resources to the second logical channel according to a priority of the second logical channel and data units carried on the second logical channel comprises:
allocating, at a second moment, a second resource to the second logical channel according to the size of the first resource and the data units carried on the second logical channel, the second resource is all or part resources of remaining resources except the first resource in the total resources, and the second moment is after the first moment.

5. The method according to claim 1, wherein the allocating a first resource in the total resources to the first logical channel according to a priority of the first logical channel and data units carried on the first logical channel comprises:
allocating, at the fourth moment, the first resource having a size equal to the size of the n data units to the first logical channel according to the data units carried on the first logical channel, and the size of n+1 data units carried on the first logical channel is larger than the product of the PBR and the TTI of the first logical channel, and the first resource is all or part resources of remaining resources except the second resource in the total resources;
the method further comprises:
allocating, at a fifth moment, a third resource to the second logical channel, the fifth moment is after the fourth moment, and the third resource is all or part resources of remaining resources except the first resource and the second resource in the total resources.

6. The method according to claim 5, wherein the method further comprises:
allocating, at a sixth moment, a fourth resource to the first logical channel, the sixth moment is after the fifth moment, and the fourth resource is remaining resources except the first resource, the second resource, and the third resource in the total resources.

7. The method according to claim 1, wherein the at least one logical channel comprises a third logical channel that does not have the function of segmenting the data unit, the priority of the first logical channel is equal to a priority of the third logical channel, and
the method further comprises:
determining a difference between the size of the n data units and the size of the first resource to be a size of first padding bits, if a fifth resource having a size equal to a size of l data units carried on the third logical channel is firstly allocated to the third logical channel and then the first resource having a size larger than the size of the n data units is allocated to the first logical channel, and the size of the fifth resource is smaller than or equal to a product of a PBR and a TTI of the third logical channel; and
determining a difference between the size of the l data units and the size of the fifth resource to be a size of second padding bits, if the first resource having a size equal to the size of the n data units is firstly allocated to the first logical channel and then the fifth resource having a size larger than the size of the l data units is allocated to the third logical channel; and
when the size of the first padding bits is smaller than the size of the second padding bits,
before the allocating a first resource in the total resources to the first logical channel according to a priority of the first logical channel and data units carried on the first logical channel, the method further comprises:
allocating the fifth resource having a size equal to the size of the l data units to the third logical channel; and
the allocating a first resource in the total resources to the first logical channel according to a priority of the first logical channel and data units carried on the first logical channel comprises:
allocating the first resource having a size larger than the size of the n data units to the first logical channel;
when the size of the first padding bits is larger than the size of the second padding bits,
the allocating a first resource in the total resources to the first logical channel according to a priority of the first logical channel and data units carried on the first logical channel comprises:
allocating the first resource having a size equal to the size of the n data units to the first logical channel, and
after the allocating a first resource in the total resources to the first logical channel according to a priority of the first logical channel and data units carried on the first logical channel, the method further comprises:
allocating the fifth resource having a size larger than the size of the l data units to the third logical channel.

8. A terminal device, comprising a processor and a memory storing instructions thereon, the processor when executing the instructions, being configured to:
determine a priority of at least one logical channel and total resources allocated to the at least one logical channel, the at least one logical channel comprises a first logical channel that does not have a function of segmenting a data unit;
allocate a first resource in the total resources to the first logical channel according to a priority of the first logical channel and data units carried on the first logical channel, the first resource is used to transmit n data units carried on the first logical channel, a size of the first resource is larger than or equal to a size of the n data units and the size of the first resource is smaller than or equal to a product of a priority bit rate (PBR) and a transmission time interval (TTI) of the first logical channel, and n is a positive integer; and transmit the n data units by the first resource;

wherein the at least one logical channel comprises a second logical channel that has the function of segmenting the data unit, and the processor is further configured to:

allocate a second resource for transmitting m data units carried on the second logical channel in the total resources to the second logical channel according to a priority of the second logical channel and data units carried on the second logical channel, a size of the m data units is equal to a size of the second resource, and m is a positive number;

wherein if the priority of the first logical channel is smaller than the priority of the second logical channel, allocating, at a third moment, the second resource to the second logical channel, the size of the second resource is equal to a product of a PBR and a TTI of the second logical channel, and allocating, at a fourth moment, the first resource to the first logical channel, the third moment is before the fourth moment.

9. The terminal device according to claim 8, wherein a size of n+1 data units carried on the first logical channel is larger than the size of the first resource.

10. The terminal device according to claim 8, wherein the size of the n data units is smaller than the size of the first resource, and the processor is further configured to:

transmit, by the first resource, the n data units carried on the first logical channel and first padding bits, and a size of the first padding bits is equal to a difference between the size of the n data units and the size of the first resource.

11. The terminal device according to claim 8, wherein the priority of the first logical channel is larger than or equal to the priority of the second logical channel, and the processor is further configured to:

allocate, at a first moment, the first resource having a size equal to the size of the n data units to the first logical channel according to the data units carried on the first logical channel, and the size of the n+1 data units carried on the first logical channel is larger than the product of the PBR and the III of the first logical channel; and allocate, at a second moment, a second resource to the second logical channel according to the size of the first resource and the data units carried on the second logical channel, the second resource is all or part resources of remaining resources except the first resource in the total resources, and the second moment is after the first moment.

12. The terminal device according to claim 8, wherein the processor is further configured to:

allocate, at the fourth moment, the first resource having a size equal to the size of the n data units to the first logical channel according to the data units carried on the first logical channel, and the size of n+1 data units carried on the first logical channel is larger than the product of the PBR and the TTI of the first logical channel, and the first resource is all or part resources of remaining resources except the second resource in the total resources;

allocate, at a fifth moment, a third resource to the second logical channel, the fifth moment is after the fourth moment, and the third resource is all or part resources of remaining resources except the first resource and the second resource in the total resources.

13. The terminal device according to claim 12, wherein the processor is further configured to:

allocate, at a sixth moment, a fourth resource to the first logical channel, the sixth moment is after the fifth moment, and the fourth resource is remaining resources except the first resource, the second resource, and the third resource in the total resources.

14. The terminal device according to claim 8, wherein the at least one logical channel comprises a third logical channel that does not have the function of segmenting the data unit, the priority of the first logical channel is equal to a priority of the third logical channel, and the processor is further configured to:

determine a difference between the size of the n data units and the size of the first resource to be a size of first padding bits, if a fifth resource having a size equal to a size of l data units carried on the third logical channel is firstly allocated to the third logical channel and then the first resource having a size larger than the size of the n data units is allocated to the first logical channel, and the size of the fifth resource is smaller than or equal to a product of a PBR and a TTI of the third logical channel; and determine a difference between the size of the l data units and the size of the fifth resource to be a size of second padding bits, if the first resource having a size equal to the size of the n data units is firstly allocated to the first logical channel and then the fifth resource having a size larger than the size of the l data units is allocated to the third logical channel; and the processor is further configured to:

firstly allocate the fifth resource having a size equal to the size of the l data units to the third logical channel and then allocate the first resource having a size larger than the size of the n data units to the first logical channel, when the size of the first padding bits is smaller than the size of the second padding bits; and firstly allocate the first resource having a size equal to the size of the n data units to the first logical channel and then allocate the fifth resource having a size larger than the size of the l data units to the third logical channel, when the size of the first padding bits is larger than the size of the second padding bits.

* * * * *